Feb. 4, 1941.                L. BIRKIGT                2,230,740
               MULTICYLINDER INTERNAL COMBUSTION ENGINE
                        Filed Oct. 18, 1939
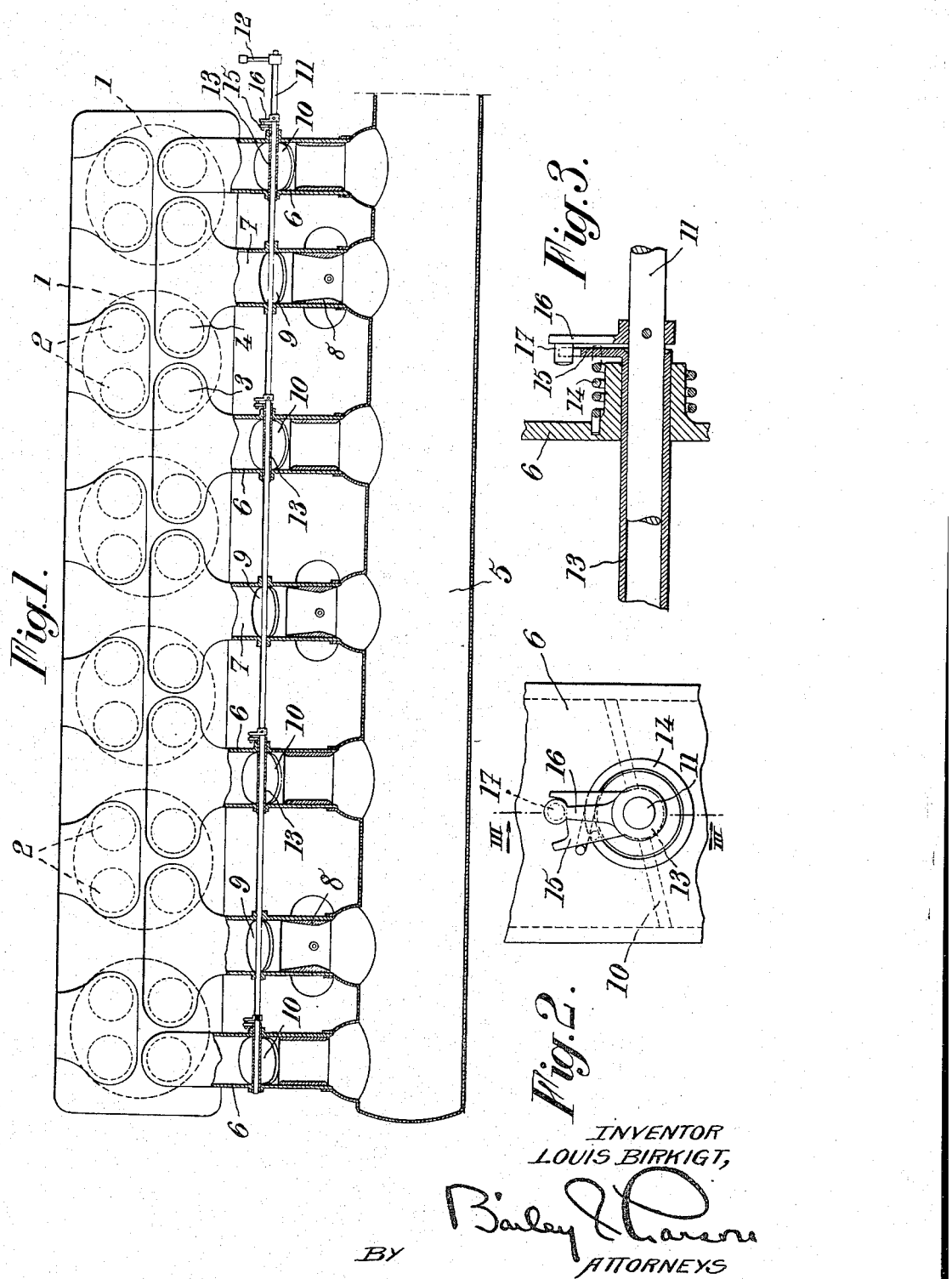
INVENTOR
LOUIS BIRKIGT,
BY
ATTORNEYS Patented Feb. 4, 1941

2,230,740

UNITED STATES PATENT OFFICE 2,230,740

MULTICYLINDER INTERNAL COMBUSTION ENGINE

Louis Birkigt, Versoix, near Geneva, Switzerland

Application October 18, 1939, Serial No. 300,096
In Belgium July 1, 1939

21 Claims. (Cl. 123—75)

This invention relates to multicylinder internal combustion engines the combustion chambers of which are scavenged, at each cycle, by a gas under pressure (generally pure air) the inlet and exhaust orifices provided in each of the said chambers having a common opening period during which the scavenging takes place, and concerns more particularly but not exclusively, among these engines, those for aircraft.

It has been observed with such engines, at feeble and medium powers, that the pressure of the scavenging gas is lower than the pressure prevailing in the combustion chambers at the commencement of the scavenging phase. There resulted therefrom, in such conditions of operation of the engine, a blowing back of the burnt gases contained in the combustion chambers towards the source of scavenging gas. Such burnt gases which had thus been delivered upstream of the combustion chambers again entered these latter when the scavenging pressure became preponderant and there resulted therefrom a disturbance of the feed and of the scavenging of the said chambers.

The present invention has for its main object so to make such engines that they respond, better than hitherto, to the various desiderata of practice and, especially, that they no longer present, at feeble and medium powers, the disadvantage indicated above.

In general, in accordance with the invention, such engines, which have a plurality of pipes connecting a scavenging-gas collector to the combustion chambers of the said engines, have provided, in each of such pipes and preferably as close as possible to the corresponding combustion chamber or chambers, means for preventing or at least opposing, at medium and feeble powers of the engine, the setting-up of a gaseous stream from the said chambers towards the scavenging-gas collector; the said means can with advantage be constituted by flow-regulating members, for example valves.

In order that the invention may be better understood, it will now be described with reference to the accompanying drawing, which is given by way of example only and in which:

Fig. 1 shows, in a diagrammatic manner, a multicylinder internal combustion engine constructed according to the invention.

Figs. 2 and 3 show, on a larger scale, respectively in elevation and axial section on the line III—III Fig. 2, certain regulating members of the engine.

The engine represented in the drawing is, for example, a four-stroke engine for aircraft and is constituted, as a whole, in any usual manner and comprises a plurality of cylinders 1 grouped, for example, in one or more rows, the said rows being adapted, in this latter case, to be of V, X, H or other formation.

It also comprises a feed system for the scavenging under pressure of the combustion chambers of the cylinders 1, preferably by pure air. For this purpose there is provided, for each combustion chamber, at least one and preferably two exhaust valves or the like 2 and at least two inlet valves or the like 3 and 4, these latter for the introduction, into the combustion chamber, respectively of pure scavenging and feed air, and of carburetted air.

A compressor (not shown) is provided for feeding the inlet valves 3 and 4 from a delivery collector 5 which is connected to the combustion chambers of the cylinders 1 by pipes 6 and 7 intended respectively for the flow of pure air and of carburetted air, a single pipe being adapted to supply the valves of the same type (air-inlet valves 3 or valves 4 for the inlet of carburetted mixture) of two adjacent cylinders.

In addition there are provided, on the pipes 7 which are traversed by carburetted air, means for charging with fuel the pure air coming from the collector 5, which means may be constituted, for example, by carburettors 8 each provided with a delivery-regulating device such as a valve 9 or the like.

According to the principal feature of the invention, there are provided, in each of the connecting pipes through which scavenging gas flows (for the engine considered the pipes 6 in which pure air flows), means for preventing or at least opposing, at medium and feeble powers of the engine, the blowing back of burnt gases from the cylinders 1 towards the pure feed and scavenging air collector 5.

Although such means can be constituted by a species of non-return valves so arranged as only to permit the flow of the air from the collector 5 towards the cylinder 1, it is preferable so as to arrange the said means that they only cause a throttling in the pipes 6 at feeble and medium powers, leaving the said pipes completely unrestricted at high powers for which the scavenging pressure is sufficient to oppose the blowing back of burnt gases.

For engines with which the particular description is concerned, that is of the type with double feed (pure air and carburetted air), it is of the greatest interest to provide delivery-regulating members both on the carburetted mixture circuit (the corresponding members being constituted by the valves 9 of carburettors 8) and on the scavenging and feed air circuit. This arrangement permits either of regulating the working conditions of the engine by an operation of the two regulating systems, or of modifying only the quality of the mixture finally formed in the cylinders, by an operation of the delivery-regulating system affecting the scavenging and feed air.

Taking this fact into consideration, the means adapted to prevent the blowing back of burnt gases are with advantage constituted by a system for regulating the delivery of the scavenging and feed air.

This system comprises a plurality of regulating members such for example as valves 10 which are located in the pipes 6, preferably as close as possible to the corresponding inlet orifices.

It then is advantageous to connect the controls of the valves 9 and 10 while allowing the possibility of independently operating the valves 10, between certain limits at least, when it is desired to modify the richness of the mixture.

Further, arrangements preferably are made so that there is normally, between the valves 9 and 10, an angular displacement which allows the valves 10 concerned with the flow of pure air to come into closing position slightly before the valves 9 concerned with the circulation of carburetted air. For this purpose, for example, all the valves 9 are fixed on a single spindle 11 connected to a general control 12, and the valves 10 are fixed on as many sleeves 13 mounted loosely on the spindle 11, a spring or the like 14 coacting with each valve 10 in order to urge it towards its closing position.

For the operation of each valve 10, there is fixed, respectively on the corresponding sleeve 13 and on the adjoining portion of the spindle 11, a fork 15 and an arm 16 carrying at its extremity a finger 17 engaging between the arms of the said fork.

The operation is then the following: At medium and feeble powers, for which the valves 9 only are partially open, the valves 10, acted upon by the springs 14, will occupy positions (still closer to their closing position) for which they will obturate partially or even completely, the pipes 6, thus preventing, for these conditions of running, untimely blowing back of burnt gases from the cylinders 1 towards the collector 5. On the contrary, at high powers, for which this risk is no longer to be feared, the valves 10 will be opened, similarly to the valves 9, and permit the passage of a considerable quantity of scavenging and feed air.

In addition, means, with manual or automatic control, could be provided for modifying, at any working condition of the engine, the richness of the mixture, the said means to be interposed between the general control 12 and a control of all the sleeves 13 to permit of modifying the relative angular positions of the said sleeves with respect to the spindle 11.

Of course, the invention could be applied to engines with scavenging under pressure of a type other than that with double feed herein particularly considered and, especially, to engines in which the scavenging and the feed would take place through the same orifices and the fuel would be injected periodically into the current of air under pressure sent towards these orifices by a compressor. In this case the means for preventing the blowing back of burnt gases at the commencement of the scavenging could with advantage be constituted, as before, by delivery-regulating members with connected controls disposed in the pipes supplying each of the aforesaid orifices.

The invention is not limited to the precise forms or details of construction described, as these may be varied to suit particular cases.

Having now particularly described and ascertained the nature of my said invention and in what manner the same is to be performed, I declare that what I claim is:

1. In a multicylinder internal combustion engine of the kind comprising means for admitting air under pressure to the combustion chambers of the cylinders of such engine through connecting pipes from a compressed air collector, a construction including, in the said connecting pipes, means acting to prevent a blowing back of burnt gases from each combustion chamber to the said air collector, so arranged and operated that they effect a substantial throttling of the air pipes only at feeble or medium powers of the engine whilst leaving substantially the entire cross-action of the piping unthrottled at high powers of the engine.

2. In a multicylinder internal combustion engine of the kind comprising means for admitting air under pressure to the combustion chambers of the cylinders of such engine through connecting pipes from a compressed air collector, a construction including, in the said connecting pipes, means, disposed in the immediate vicinity of the openings of the scavenging-gas pipes into the said combustion chambers, acting to prevent a blowing back of burnt gases from each combustion chamber to the said air collector, so arranged and operated that they effect a substantial throttling of the air pipes only at feeble or medium powers of the engine whilst leaving substantially the entire cross-section of the piping unthrottled at high powers of the engine.

3. In a multicylinder internal combustion engine of the kind comprising means for admitting air under pressure to the combustion chambers of the cylinders of such engine through connecting pipes from a compressed air collector, a construction including, in the said connecting pipes, an adjustable throttle valve disposed in the immediate vicinity of the openings of the air pipes into the said combustion chambers, acting to prevent a blowing back of burnt gases from each combustion chamber to the said air collector, and means for controlling said throttle valve in accordance with the power of the engine.

4. In a multicylinder internal combustion engine of the kind comprising means for admitting air under pressure to the combustion chambers of the cylinders of such engine through connecting pipes from a compressed air collector, a construction including, in the said connecting pipes, an adjustable throttle valve acting to prevent a blowing back of burnt gases from each combustion chamber to the said air collector, so arranged and operated that they effect a substantial throttling of the air pipes only at feeble or medium powers of the engine whilst leaving substantially the entire cross-section of the piping unthrottled at high powers of the engine.

5. In a multicylinder internal combustion engine of the kind comprising means for admitting air under pressure to the combustion chambers of the cylinders of such engine through connecting pipes from a compressed air collector, a construction including, in the said connecting pipes, an adjustable throttle valve disposed in the immediate vicinity of the openings of the scavening-gas pipes into the said combustion chambers, acting to prevent a blowing back of burnt gases from each combustion chamber to the said air collector, so arranged and operated that they effect a substantial throttling of the air pipes only at feeble or medium powers of the engine whilst leaving substantially the entire cross-section of the piping unthrottled at high powers of the engine.

6. In a multicylinder internal combustion engine of the kind comprising a collector for air under pressure for admitting on the one hand pure air from the said collector to the combustion chambers of the cylinders of such engine and, on the other hand, for admitting air under pressure to other pipes connecting the said collector to the said combustion chambers, which latter pipes include means for supplying fuel thereto to pass to the said combustion chambers, a construction including, in the connecting pipes for the pure air, means, disposed in the immediate vicinity of the openings of the pure air pipes into the said combustion chambers, acting to prevent a blowing back of burnt gases from each combustion chamber to the said air collector, so arranged and operated that they effect a substantial throttling of the pure air pipes only at feeble or medium powers of the engine whilst leaving substantially the entire cross-section of the piping unthrottled at high powers of the engine, and other means in the pipes connecting the collector for air to the combustion chambers of the engine which latter pipes include means for the supply of fuel, said other means acting to regulate the supply of the thus-constituted carburetted air to the combustion chambers of the engine, for the purpose set forth.

7. A multicylinder internal combustion engine as claimed in claim 6 in which the regulating means for the supply of pure air to the combustion chambers of the cylinders is connected to the regulating means for the supply of fuel mixture to the said combustion chambers, for the purposes set forth.

8. A multicylinder internal combustion engine as claimed in claim 6 in which the regulating means for both the supply of pure air and corburetted mixture to the cylinders are comprised by throttle valves and in which the said throttle valves are mounted on a common operating spindle.

9. In a multicylinder internal combustion engine of the kind comprising a collector for air under pressure for admitting on the one hand pure air from the said collector to the combustion chambers of the cylinders of such engine and, on the other hand, for admitting air under pressure to other pipes connecting the said collector to the said combustion chambers, which latter pipes include means for supplying fuel thereto to pass to the said combustion chambers, a construction including, in the connecting pipes for the pure air, means, disposed in the immediate vicinity of the openings of the pure air pipes into the said combustion chambers, acting to prevent a blowing back of burnt gases from each combustion chamber to the said air collector, so arranged and operated that they effect a substantial throttling of the pure air pipes only at feeble or medium powers of the engine whilst leaving substantially the entire cross-section of the piping unthrottled at high powers of the engine, and other means in the pipes connecting the collector for air to the combustion chambers of the engine which latter pipes include means for the supply of fuel, said other means acting to regulate the supply of the thus-constituted carburetted air to the combustion chambers of the engine, the regulating means for both the supply of pure air and carburetted mixture to the cylinders being comprised by throttle valves, the said throttle valves being mounted on a common operating spindle in such manner that the said valves in the pipes for pure air are adapted to attain their closing position before the valves in the pipes for carburetted mixture.

10. A multicylinder internal combustion engine as claimed in claim 9 in which the valves in the pipes for supplying pure air are adjustable within a predetermined range to regulate the ratio of pure air to the mixture of fuel and air, for the purposes set forth.

11. A multicylinder internal combustion engine as claimed in claim 9 in which the valves controlling the admission of pure air to the combustion chambers are connected to the valves for controlling the supply of fuel mixture through mechanism allowing angular play controlled by spring means, substantially as and for the purposes set forth.

12. In an internal combustion engine of the kind comprising means for admitting air under pressure to the combustion chamber of the cylinder of such engine through a connecting pipe from a source of compressed air, a construction including, in the said connecting pipe, means acting to prevent a blowing back of burnt gases from the combustion chamber to the said air source, so arranged and operated that they effect a substantial throttling of the air pipe only at feeble or medium powers of the engine whilst leaving substantially the entire cross-section of the pipe unthrottled at high powers of the engine.

13. In an internal combustion engine of the kind comprising means for admitting air under pressure to the combustion chamber of the cylinder of such engine through a connecting pipe from a source of compressed air, a construction including, in the said connecting pipe, means disposed in the immediate vicinity of the opening of the air pipe into the said combustion chamber, acting to prevent a blowing back of burnt gases from the combustion chamber to the said air source, so arranged and operated that they effect a substantial throttling of the air pipe only at feeble or medium powers of the engine whilst leaving substantially the entire cross-section of the pipe unthrottled at high powers of the engine.

14. In an internal combustion engine of the kind comprising means for admitting air under pressure to the combustion chamber of the cylinder of such engine through a connecting pipe from a source of compressed air, a construction including, in the said connecting pipe, an adjustable throttle valve disposed in the immediate vicinity of the opening of the air pipe into the said combustion chamber, acting to prevent a blowing back of burnt gases from the combustion chamber to the said air source, so arranged and operated that they effect a substantial throttling of the air pipe only at feeble or medium powers of the engine whilst leaving substantially the entire cross-section of the pipe unthrottled at high powers of the engine.

15. In an internal combustion engine, comprising a collector for air under pressure for admitting on the one hand pure air under pressure from the said collector to the combustion chamber of the cylinder of such engine, and on the other hand for admitting air under pressure to another pipe connecting said collector to said combustion chamber, which later pipe includes means for supplying fuel thereto to pass to the said combustion chamber, a construction including in the connecting pipe for the pure air means acting to prevent a blowing back of burnt gases from said combustion chamber to the said collector for air under pressure.

16. An internal combustion engine as claimed in claim 15 in which said last means comprises at least one throttle valve.

17. In an internal combustion engine of the kind comprising a source for air under pressure, for admitting on the one hand pure air from said source through a connecting pipe to the combustion chamber of the cylinder of such engine, and on the other hand for admitting air under pressure to a second pipe connecting said source to said combustion chamber which latter pipe includes means for supplying fuel thereto to pass to the said combustion chamber, a construction including throttling means in the connecting pipe for the pure air and other throttling means in the pipe including means for supplying fuel, said other throttling means acting to regulate the supply of the carburetted mixture to the combustion chamber of the engine and a common operating spindle for both said throttling means on which they are mounted in such a manner that the throttle means in the pipe for pure air are adapted to attain their closing position before the throttle means in the pipe for carburetted mixture.

18. An internal combustion engine as claimed in claim 17, in which the throttle means in the pipe for supplying pure air are adjustable within a predetermined range to regulate the ratio of pure scavenging air to the carburetted mixture.

19. A multicylinder internal combustion engine as claimed in claim 1, each cylinder of which comprises two inlet valves and in which adjacent cylinders have connected thereto a pipe from the collector for air under pressure to supply pure air to the said cylinders through the control of a suitable valve, and further in which adjacent cylinders have connected thereto another pipe communicating with the said collector for air under pressure and with the two adjacent cylinders for supplying carburetted mixture to the two said cylinders under the control of a suitable valve.

20. In an internal combustion engine of the kind comprising a collector for air under pressure for admitting on the one hand pure air from the said collector to the combustion chamber of the cylinder of such engine and, on the other hand, for admitting air under pressure to another pipe connecting the said collector to the said combustion chamber, which latter pipe includes means for supplying fuel thereto to pass to the said combustion chamber, a construction including, in the connecting pipe for the pure air, means, disposed in the immediate vicinity of the openings of the pure air pipe into the said combustion chamber, acting to prevent a blowing back of burnt gases from the combustion chamber to the said air collector, so arranged and operated that they effect a substantial throttling of the pure air pipe only at feeble or medium powers of the engine whilst leaving substantially the entire cross-section of the pipe unthrottled at high powers of the engine, and other means in the pipe connecting the collector for air to the combustion chamber of the engine which latter pipe includes means for the supply of fuel, said other means acting to regulate the supply of the thus-constituted carburetted air to the combustion chamber of the engine, for the purpose set forth.

21. In an engine as claimed in claim 20, in which the means in said pipes are constituted by throttle valves, means adjustably mounting the valves controlling the pure air pipes with relation to the valves for controlling the admission of carburetted mixture to the said combustion chamber.

LOUIS BIRKIGT.